United States Patent [19]

Breiter et al.

[11] 3,946,751

[45] Mar. 30, 1976

[54] CELL CASING WITH A HERMETIC MECHANICAL SEAL AND A HERMETICALLY SEALED SODIUM-SULFUR CELL

[75] Inventors: Manfred Wolfgang Breiter, Schenectady; Stephan P. Mitoff, Elnora; Robert W. Powers, Schenectady, all of N.Y.

[73] Assignee: General Electric Company, Schenectady, N.Y.

[22] Filed: Feb. 18, 1975

[21] Appl. No.: 550,464

[52] U.S. Cl. ............... 136/6 FS; 136/20; 136/83 R; 136/153
[51] Int. Cl.² ........................................ H01M 10/00
[58] Field of Search ............ 136/6 FS, 6 F, 6 R, 20, 136/83 R, 153

[56] References Cited
UNITED STATES PATENTS

| | | |
|---|---|---|
| 3,404,036 | 10/1968 | Kummer et al. .......................... 136/6 |
| 3,503,808 | 3/1970 | Agauss et al. ....................... 136/83 R |
| 3,811,943 | 5/1974 | Minck ................... 136/6 FS |
| 3,826,685 | 7/1974 | Dubin et al. ....................... 136/20 X |
| 3,833,420 | 9/1974 | Will ...................... 136/6 R |
| 3,868,273 | 2/1975 | Will et al. ........................ 136/20 X |

*Primary Examiner*—G. L. Kaplan
*Assistant Examiner*—C. F. LeFevour
*Attorney, Agent, or Firm*—Paul R. Webb, II; Joseph T. Cohen; Jerome C. Squillaro

[57] ABSTRACT

A cell casing and a hermetically sealed sodium-sulfur cell are disclosed wherein the cell casing includes a hermetic mechanical seal joining two opposed outer metallic casing portions to a ceramic ring supporting an inner casing of a solid sodium ion-conductive material. A hermetically sealed sodium-sulfur cell has the above type of casing with a sodium negative electrode in the inner casing and a positive electrode of sulfur in conductive material in an outer casing portion surrounding the inner casing.

7 Claims, 2 Drawing Figures

U.S. Patent   March 30, 1976   3,946,751
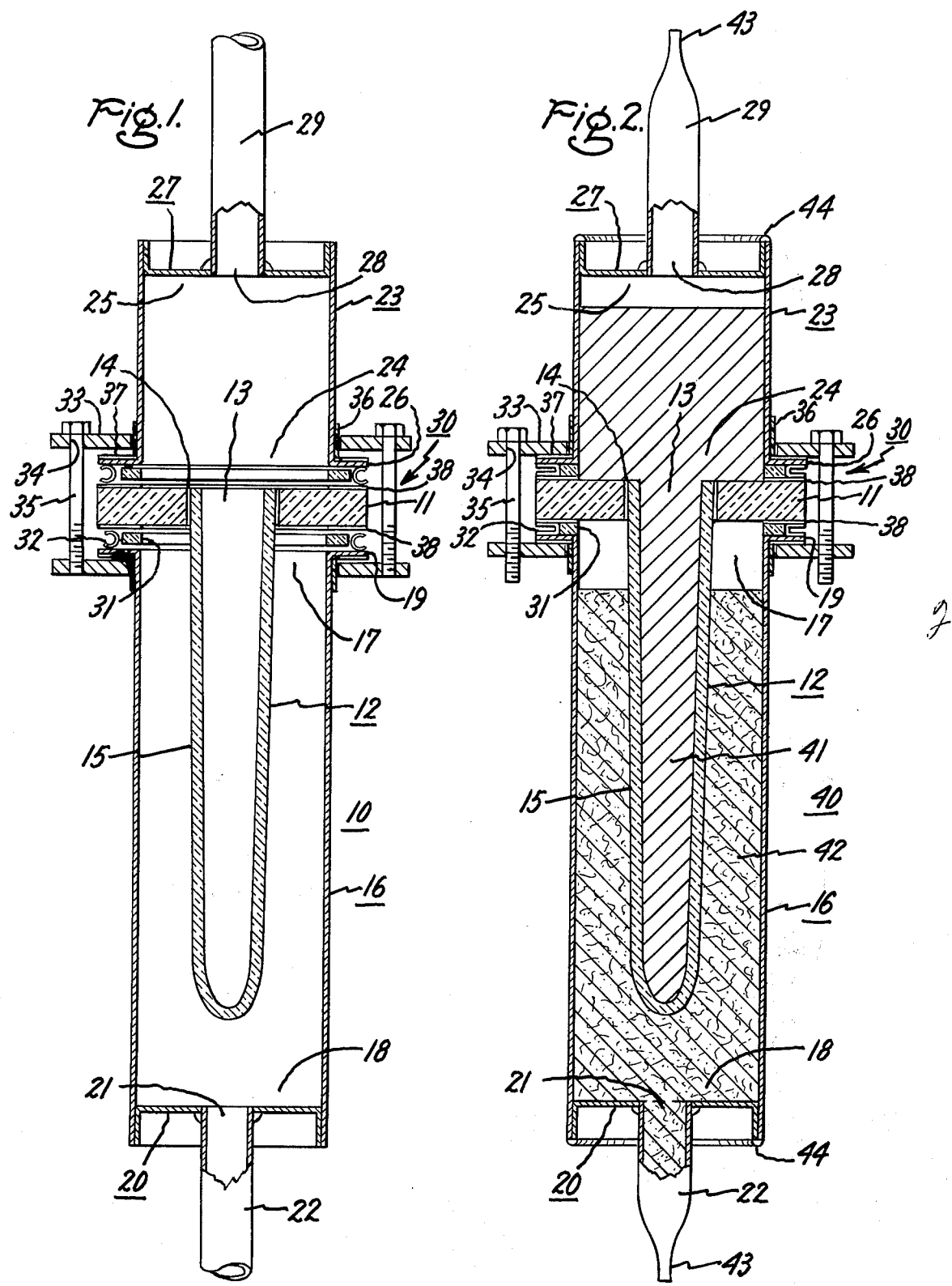

CELL CASING WITH A HERMETIC MECHANICAL SEAL AND A HERMETICALLY SEALED SODIUM-SULFUR CELL

This invention relates to improved cell casings and to hermetically sealed cells and, more particularly, to such a cell casing with a hermetic mechanical seal and to a hermetically sealed sodium-sulfur cell.

Sodium-sulfur cells, which operate at elevated temperatures, are known in the prior art as, for example, described in Kummer et al U.S. Pat. No. 3,404,036 issued Oct. 1, 1968 under the title "Energy Conversion Device Comprising a Solid Crystalline Electrolyte and a Solid Reaction Zone Separator". The solid crystalline ion-conductive electrolyte in the above-mentioned sodium-sulfur battery can be sodium beta-alumina.

Sodium-sulfur batteries are shown also, for example, in Kummer et al U.S. Pat. No. 3,404,036 and in Kummer et al U.S. Pat. No. 3,413,150.

In above Kummer et al U.S. Pat. No. 3,404,036, there is shown in FIG. 2, and there is described in column 8, lines 24–32, and in column 9, lines 1–19, a thermo-electric generator wherein sodium is contained in an inner tube and a vacuum is created in an outer metal tube. The outer metal tube has a flange at its open end which flange is provided with a groove or channel in which rests a rubber O-ring for a vacuum tight seal. A metal cover plate is secured to the outer tube by thread, bolt or other conventional attaching means not shown. The outer metal tube does not contain sulfur or a sulfur component. FIG. 1 of this patent shows and column 4, lines 19–39 describes a sodium-sulfur battery wherein glass tubes 11 are sealed by glass to the sodium beta-alumina.

Our present invention is directed to providing an improved cell casing with a hermetic mechanical seal and an improved hermetically sealed sodium-sulfur cell over the above-identified patents in that a glass seal joins a portion of an inner casing of a solid sodium ion-conductive material to the interior surface of a ceramic ring, and a hermetic mechanical seal joins two opposed outer metallic casing portions to the ceramic ring.

The primary objects of our invention are to provide an improved cell casing with a hermetic mechanical seal and an improved hermetically sealed sodium-sulfur cell which hermetic mechanical seal provides such a casing or battery with long life and resistance to corrosion.

In accordance with one aspect of our invention, a cell casing includes a glass seal which joins a portion of inner casing of a sodium beta-alumina ion-conductive material to the interior surface of a ceramic ring, and a hermetic mechanical seal joins two opposed outer metallic casing portions to the ceramic ring.

These and various other objects, features and advantages of the invention will be better understood from the following description taken in connection with the accompanying drawing in which:

FIG. 1 is a sectional view of a cell casing with a hermetic mechanical seal made in accordance with our invention; and FIG. 2 is a sectional view of a cell made in accordance with our invention.

In FIG. 1 of the drawing, there is shown generally at 10 a cell casing embodying our invention which has a ceramic ring 11, an inner casing of a solid sodium ion-conductive material 12 with one open end 13, and a glass seal 14 sealing a portion of the outer wall 15 of inner casing 12 adjacent its open end 13 within and to the ceramic ring 11. A first outer metallic casing portion 16 with opposite open ends 17 and 18 and a flange 19 at open end 17 surrounds inner casing 12 and is spaced therefrom. A removable closed end 20 for opposite open end 18 of first outer casing portion 16 has a fill opening 21 in removable closed end 20, and a fill tube 22 affixed to removable closed end 20 and in communication with the fill opening 21.

A second outer metallic casing portion 23 has opposite open ends 24 and 25 and a flange 26 at open end 24. Second outer metallic casing portion 23 extends in an opposite direction to first outer metallic casing 16. A second removable closed end 27 for opposite open end 25 of second outer casing portion 23 has a fill opening 28 in second removable closed end 27, and a fill tube 29 affixed to second removable closed end 27 and in communication with fill opening 28.

First and second outer metallic casing portions 16 and 23 are joined to ceramic ring 11 by a hermetic mechanical seal shown generally at 30 thereby forming a continuous outer cell casing. Seal 30 comprises a pair of retainer rings 31, each of which is positioned between ceramic ring 11 and an adjacent flange 19 or 26 of outer casing portions 16 and 23, respectively. A pair of open "C" shaped sealing rings 32 are positioned similarly to rings 31 but surround exteriorly and are spaced from rings 31. The open portion of each "C" shaped sealing ring faces outwardly. A retaining collar 33 is positioned around each outer metallic casing portion and adjacent to the opposite surface of the casing flange. Each collar 33 has at least a pair of and preferably a plurality of apertures 34 therethrough. The collars are positioned so that the respective apertures 34 are aligned. Threaded fasteners 35, each passing through a pair of associated apertures, are employed to tighten the mechanical seal to produce a hermetic mechanical seal 30. Electrical insulation 36 in the form of fiberglass tape is shown wound around the exterior surface of outer casing portions 16 and 23 adjacent the respective flanges 19 and 26 to prevent short-circuiting of the cell by seal 30. Electrical insulation 37 in the form of an inorganic fiber cloth ring is positioned between each flange 19 and 26 and the surface of each associated collar 33 to prevent short-circuiting of the cell by seal 30. While the opposite surfaces of ceramic ring 11 are smooth to insure a good seal, there is shown also a preferred ring 38 of aluminum foil between the opposite surface of retainer ring 31 and sealing ring 32, and the associated surface of ceramic ring 11 to provide a smoother surface. In FIG. 1, seal 30 is shown in position but fasteners 35 have not been tightened to show more clearly the details of the hermetic mechanical seal.

We found that we could form such a cell casing with a hermetic mechanical seal by providing a ceramic ring with opposite smooth surfaces, for example, of alpha-alumina. An inner casing of a solid sodium ion-conductive material of sodium beta-alumina with one open end has a portion of its outer wall adjacent its open end sealed within and to the ceramic ring with a glass seal. A first outer metallic or non-metallic casing portion with opposite open ends and a flange at one open end adjacent the ceramic ring is positioned around the inner casing and is spaced therefrom. A removable metallic or non-metallic closed end is provided for the opposite open end of the first outer casing. This closed end has a fill opening therein and a fill tube affixed thereto and is in communication with the fill opening. A second outer metallic casing portion with opposite open ends and a flange at one open end is positioned with the flange adjacent the ceramic ring whereby the second outer metallic casing portion is spaced from and extends in an opposite direction to the first outer metallic casing. A metallic removable closed end is provided for the opposite open end of the second outer casing portion. This closed end has a fill opening therein and a fill tube affixed thereto and is in communication with the fill opening.

We found further that we could form such a cell casing as described above but that either or both outer casing portions can be provided with a closed end rather than a removable closed end.

The first and second outer casing portions are joined to the ceramic ring by a hermetic mechanical seal thereby forming a continuous outer battery casing. The seal comprises a pair of retainer rings, each of which is positioned between the ceramic ring and an adjacent flange of the outer casing portion. A pair of open "C" shaped sealing rings are positioned similarly to the retainer rings but surround exteriorly and are spaced from the retainer rings. The open portion of each "C" shaped sealing ring faces outwardly. A retaining collar is positioned around each outer metallic casing portion and adjacent to the opposite surface of the casing flange. Each collar has at least a pair of and preferably a plurality of apertures therethrough. The collars are positioned so that the respective apertures are aligned. Threaded fasteners, each passing through a pair of associated apertures, are employed to tighten the mechanical seal to produce a hermetic mechanical seal. Electrical insulation is provided around the exterior surface of the outer casing portions adjacent the associated flanges and between each flange and the associated collars to prevent short-circuiting of the cell by the seal. While we have described fiberglass tape around the exterior surface of the casing and inorganic fiber cloth between each flange and its associated collar, it will be appreciated that a variety of electrical insulation materials can be employed. We found further that while a smooth faced ceramic ring insured a good seal, we found it preferable to employ a ring of material such as aluminum foil to produce an even smoother surface. In FIG. 1, the seal is shown in position but the fasteners have not been tightened to show more clearly the details of the hermetic mechanical seal.

We found that the first outer casing portion, which is adapted to contain a positive electrode of sulfur in an electrically conductive material, can be made of a metal or a non-metal. Suitable metals for the first outer casing portion include molybdenum, aluminum and stainless steel. A suitable non-metallic material for the first outer casing is aluminum oxide. The second outer casing portion, which is adapted to contain a sodium negative electrode, is made of metal since sodium attacks generally non-metals. Suitable metals include stainless steel, or an alloy of 20 weight percent nickel, 17 weight percent cobalt, 0.2 weight percent manganese and the balance iron. It will, of course, be appreciated that if the positioning of the electrodes is reversed, the respective outer metal casing portion is then provided from one of the above discussed compatible materials for the casing portion.

We found that retainer rings of stainless steel or aluminum were preferred but other metallic and non-metallic materials can be employed. The sealing rings are resilient metallic open edge rings in configuration such as a "C" shaped ring or a "W" shaped ring. We prefer to employ an open edge metallic "C" shaped ring made of Inconel alloy but other metals can be employed. Such open edge metallic sealing rings are commercially available, for example, from Pressure Science Inc., 11842 Old Baltimore Pike, Beltsville, Maryland. The open edge of the sealing ring can face in either direction but we prefer to have the open edge facing toward the exterior of the cell. This particular sealing ring is provided because of its corrosion resistance when employed in a cell. When the threaded fasteners are tightened and a pressure from about 300 lbs. and above is applied by the retaining collars and threaded fasteners, a hermetical seal which is helium-leak-tight on thermal cycling is produced for the casing.

We found further that either or both of the outer casing portions can be provided with an open end and a flange at the open end with the other end closed. Further, either or both of the outer casing portions can be both opposite open ends and a flange at one open end. A removable closed end is then provided for the opposite open end of each of the outer casing portions.

In FIG. 2 of the drawing, there is shown a hermetically sealed sodium-sulfur cell 40 employing cell casing 10 of FIG. 1. The hermetic mechanical seal is shown in its tightened or hermetic position. A negative electrode 41 of sodium metal is positioned preferably within inner casing 12 and partially within second outer casing portion 23. A positive electrode 42 of sulfur in an electrically conductive material is positioned preferably within outer casing portion 16 and is in contact with outer wall 15 of inner vessel 12 and with the interior surface of outer casing portion 16. A void volume is provided between ceramic ring 11 and the upper portion of positive electrode 42 to provide space for reactant during operation of the cell. Fill tubes 22 and 29 are shown closed in any suitable manner such as by respective welds 43. Closed ends 20 and 27 are affixed to outer casing portions 16 and 23, respectively, as by welding as at 44. The resulting structure is a hermetically sealed sodium-sulfur cell.

In one embodiment, we found that we could form a hermetically sealed sodium-sulfur cell by employing the above-described cell casing. The hermetic mechanical seal is shown in its tightened or hermetic position. The negative electrode, which consists of sodium metal is positioned preferably within the inner casing and its associated outer casing portion. The positive electrode is positioned preferably within the outer metallic casing portion surrounding the inner casing and is in contact with the exterior surface of the inner casing and with the interior of the outer casing portion except for a void volume at the upper end adjacent the ceramic ring. The inner casing and a portion of the associated outer casing are filled with sodium metal by filling the inner casing and by filling partially the associated outer casing through the fill tube and fill opening with molten sodium. The filltube is then closed, for example, by crimping or by welding. In this manner there is a hermetically sealed negative electrode reactant compartment for the cell. The positive electrode, which consists of sulfur in a conductive material, is then positioned within the other outer casing portion of the cell. This is accomplished, for example, by positioning an electrically conductive material such as carbon felt within this outer casing portion. This outer casing portion is filled with carbon or graphite felt, hereinafter referred to as graphite felt, so that it contacts the exterior surface of the inner casing, the inner surface of the first outer casing portion, extends to the initially open end of the surrounding outer casing portion, and provides a void volume adjacent the ceramic ring. The closed end is then welded to the outer casing portion. Molten sulfur is then filled into this outer casing portion through the associated fill tube and fill opening, and allowed to solidify within the graphite felt thereby providing the positive electrode. The fill tube is then closed, for example, by crimping or by welding. The filling tubes enable the evacuation of the cell compartments at temperatures up to 600°C with subsequent introductions of sodium and sulfur, respectively, into the evacuated compartments without contact with the atmosphere. The resulting structure is a hermetically sealed sodium-sulfur cell. While we prefer to fill the inner casings with a sodium negative electrode and may position the positive electrode within the outer casing the electrodes are interchangeable providing the conductive material is included in the positive electrode compartment.

In another embodiment we found that we could form a hermetically sealed sodium-sulfur cell by embodying the above-described casing. The hermetic mechanical seal is in its tightened or hermetic position. The negative electrode which consists of sodium metal is positioned preferably within the inner casing and its associated outer casing portion. The positive electrode is positioned preferably within the outer metal casing portion and surrounds the inner casing and is in contact with the exterior surface of the inner casing and with the interior of the outer casing portion except for a void volume at the upper end adjacent the ceramic ring. In this embodiment the second outer casing portion has an open end and a flange at the open end and the opposite end is closed. The inner casing and a portion of the associated outer casing are filled with sodium metal in accordance with the method set forth in U.S. Pat. No. 3,740,206 issued June 19, 1973 and entitled "Method For Making Sealed Container For Elemental Sodium and Method of Forming". This patent is assigned to the same assignee as the present application. This patent and its subject matter is hereby incorporated by reference into the present application. Initially, the second outer casing with its closed end is joined to the ceramic ring by the above-described hermetic mechanical seal. The first outer casing portion and associated retaining ring and open edge sealing ring are not used. Since the second outer casing portion is closed ended at the end opposite its flanges, it is necessary to provide an electronic conductor in the form of a wire lead which extends through the second outer casing into the inner casing and in contact with the closed end of the inner casing. As set forth in the above-identified patent, the inner casing is immersed at least partially in a bath provided with sodium ions, the electronic conductor is connected to the negative terminal of a DC power source and a suitable electrode in the bath is connected to the positive terminal of the same source. A DC potential is applied across the inner casing thereby filling the casing with pure elemental sodium. The inner casing is removed from the bath and the hermetic seal is removed. The first outer casing portion, associated retaining ring and associated open end sealing ring are then tightened. The first outer casing has a removable end portion with an associated fill tube. The positive electrode, which consists of sulfur in a conductive material, is then positioned within the outer casing portion of the cell. This is accomplished, for example, as above-described by positioning an electrically conductive material such as graphite felt within this outer casing portion. This outer casing portion is filled with graphite felt so that it contacts the exterior surface of the inner casing, the inner surface of the first outer casing portion, extends to the initially open end of the surrounding outer casing portion and provides a void volume adjacent the ceramic ring. The closed end is then welded to the outer casing portion. Molten sulfur is then filled into this outer casing portion through the associated fill tube and fill opening, and allowed to solidify within the graphite felt thereby providing the positive electrode. The fill tube is then closed, for example, by crimping or by welding. The resulting structure is a hermetically sealed sodium-sulfur cell.

Additionally, a closed end first outer casing portion can be used in our invention. The cell is provided with a sulfur in an electrically conductive material positive electrode within the first outer casing by employing the sulfur in a graphite felt sheet which is wound around the exterior of the inner casing prior to attaching and sealing the first outer casing portion to the cell as described previously. This is accomplished, for example, in accordance with U.S. Pat. No. 3,770,502 issued Nov. 6, 1973 and entitled "Sodium-Sulfur Storage Battery". This patent and its subject matter is hereby incorporated by reference. Such a positive electrode of sulfur in an electrically conductive material such as graphite felt can be preformed, and positioned within the first outer casing portion which is then attached and sealed to the cell as described previously. However, our positive electrode of sulfur in an electrically conductive material is in contact with the exterior surface of the inner casing and with the interior surface of the first outer casing portion.

For operation of this cell, an appropriate heating device (not shown) surrounds the cell to provide a necessary operating temperature of between 285°C and 400°C. Such a heating device can take various conventional forms such as a heating coil or a furnace. In the operation of the present sodium-sulfur cell within its elevated operating temperature during its discharge half cycle sodium ions are passed into the sulfur reactant within the cathode compartment of the cell on the opposite side of the solid sodium ion-conductive material tube. When the sodium atoms are ionized, they release electrons which are carried from the negative electrode compartment by an electric lead (not shown) to the positive electrode. In this manner electric energy is generated. While a single cell casing and a single hermetically sealed sodium-sulfur cell are described above, it will, of course, be appreciated that a multi-tube cell or a plurality of these single cells can be used to provide a useful multicell battery.

Examples of cell casings with hermetic mechanical seals and of hermetically sealed sodium-sulfur cells made in accordance with our invention are set forth below.

EXAMPLE I

A cell casing was assembled generally as above-described and as shown in FIG. 1 by providing an alpha-alumina ceramic ring, and an inner casing of a solid sodium ion-conductive material of sodium beta-alumina with one open end which has a portion of its outer wall adjacent its open end sealed within and to the ceramic ring with General Electric Company glass No. 1013. A first outer metallic casing portion of stainless steel with a closed end and an open end and a flange at the open end was provided for subsequently surrounding the inner casing and being spaced therefrom. A removable stainless steel closed end was provided for the opposite open end of the first outer casing portion. This closed end had a fill opening therein and a fill tube affixed thereto and was in communication with the fill opening.

A second outer metallic casing portion of stainless steel was provided with opposite open ends and a flange at one open end. The second outer metallic casing portion extended in an opposite direction to the first outer metallic casing portion. A second removable stainless steel closed end was provided for the opposite open end of the second outer casing portion. This second closed end had a fill opening therein and a fill tube affixed thereto and was in communication with its associated fill opening.

The first and second outer metallic casing portions were joined to the ceramic ring by a hermetic mechanical seal thereby forming a continuous outer battery casing. The seal comprised a pair of metal retainer rings, each of which was positioned between the ceramic ring and an adjacent flange of the associated outer casing portion. A pair of open Inconel alloy "C" shaped sealing rings were positioned similarly to the retainer rings but surrounded exteriorly and were spaced from the retainer rings. The open portion of each "C" shaped sealing ring faced outwardly. A retaining collar was positioned around each outer metallic casing portion and adjacent to the opposite surface of the casing flange. Each collar had at least a plurality of apertures therethrough. The collars were positioned so that the respective apertures were aligned. The collars were insulated electrically from each outer casing portion. Threaded fasteners, each passing through a pair of associated apertures, were employed to tighten the mechanical seal to about 300 lbs. of pressure to produce a hermetic mechanical seal. During tightening the mechanical seal, the open "C" shaped rings were partially closed. The casing was thermal cycled and tested in a conventional manner to show that a helium-leak-tight hermetic mechanical seal had been produced. The resulting structure was a cell casing with a hermetic mechanical seal made in accordance with our invention.

EXAMPLE II

A hermetically sealed sodium-sulfur cell was assembled by providing an alpha-alumina ceramic ring, and an inner casing of a solid sodium ion-conductive material of sodium beta-alumina with one open end which has a portion of its outer wall adjacent its open end sealed within and to the ceramic ring with General Electric Company glass No. 1013. A first outer metallic casing portion of stainless steel with a closed end and an open end and a flange at the open end was provided for subsequently surrounding the inner casing and being spaced therefrom.

A second outer metallic casing portion of stainless steel was provided with a closed end and an open end and a flange at the open end. The second outer metallic casing portion extended in an opposite direction to the subsequently joined first outer metallic casing portion. The second outer casing portion was provided with an electronic conductor in the form of a nickel lead which extended through the second outer casing portion and through the outer open end thereof. The second outer casing portion had the flange at its open end positioned adjacent the ceramic ring whereby the electronic conductor extended into and was in contact with the interior surface of the closed end of the inner casing. Initially, only the second outer casing was joined to the ceramic ring by the previously above-described hermetic mechanical seal in Example I. Thus, this seal comprised a retainer ring and an open edge "C" shaped sealing ring between the outer edge of the casing flange and the ceramic ring. A retaining collar was positioned on the opposite side of the flange and insulated electrically from the flange and the associated portion of the second outer casing portion. A similar retaining collar was positioned on the opposite side of the ceramic ring and threaded fasteners were inserted through aligned openings in the respective collars. The threaded fasteners were then tightened to about 300 lbs. of pressure to provide a hermetic seal between the second outer casing portion and the ceramic ring. The inner casing and a portion of the second outer casing was then filled with sodium in accordance with the above mentioned U.S. Pat. No. 3,740,206 by immersing the inner casing in a bath containing sodium ions after which the external portion of the electronic conductor was connected to the negative terminal of the D.C. source and the bath was connected to the positive terminal of the same source. A D.C. potential was then applied across the inner casing thereby filling the casing and filling partially the second outer casing portion. The inner casing was then removed from the bath and the sodium allowed to solidify. The threaded fasteners were untightened and the lower retaining collar was removed. Since the sodium had solidified prior to the removal of the threaded fasteners, the upper casing was sealed to the ceramic ring by means of the solidified sodium whereby the one portion of the hermetic seal was not destroyed.

A positive electrode of sulfur in graphite felt in a preformed shape with a central opening therethrough was positioned within the first outer casing portion. The first outer casing was joined to the ceramic ring by the previously above-described hermetic mechanical seal in Example I. The positive electrode was in contact with the exterior surface of the inner casing and the interior surface of the first outer casing. A similar retaining ring and open edge "C" sealing ring were provided between the flange of the first outer casing portion and the ceramic ring. A portion of the inner casing adjacent the ceramic ring was not provided with positive electrode material to provide a void volume. The lower retaining collar was positioned around the opposite surface of the flange of the first outer casing. The threaded fasteners were reinserted and were tightened to a pressure of about 300 lbs. to provide a complete hermetic mechanical seal. As it was discussed above, electrical insulation was provided between the respective flanges and retaining collars, and between the respective area of the outer casing portions and the retaining collars to prevent electrical short-circuiting of the cell. The resulting structure was a hermetically sealed sodium sulfur cell made in accordance with our invention.

EXAMPLE III

At operating temperature, the hermetically sealed sodium-sulfur cell of Example II exhibited the following polarization behavior which is shown below in Table I.

TABLE I

| Current Density-<br>ma/cm$^2$ | Cell Voltage-<br>Volts |
|---|---|
| 13 | 2.0 |
| 35 | 1.9 |
| 54 | 1.8 |
| 74 | 1.7 |
| 95 | 1.6 |

While other modifications of the invention and variations thereof which may be employed within the scope of the invention have not been described, the invention is intended to include such as may be embraced within the following claims:

What we claim as new and desire to secure by Letters Patent of the United States is:

1. A cell casing with a hermetic mechanical seal comprising a ceramic ring, an inner casing of a solid sodium ion-conductive material with one open end, a glass seal sealing a portion of the outer wall of the inner casing adjacent its open end within and to the ceramic ring, a first outer casing portion with at least one open end and a flange at the open end, the first outer casing portion surrounding the inner casing and spaced therefrom, the flange of the first outer casing portion adjacent the ceramic ring, a second outer casing portion with at least one open end and a flange at the open end positioned with the flange adjacent the ceramic ring whereby the second outer casing portion is spaced from and extends in an opposite direction to the first outer metallic casing portion, the first and second outer casing portions joined to the ceramic ring by a hermetic mechanical seal thereby forming a continuous outer cell casing, the hermetic mechanical seal insulated electrically from the outer casing portions, the hermetic mechanical seal comprising a pair of retainer rings, each retainer ring of the pair of retainer rings positioned between the ceramic ring and an adjacent flange of an associated outer casing portion, a pair of open edge metallic sealing rings, each of the pair of sealing rings positioned exteriorly of and spaced from the associated retainer ring, a retaining collar positioned around each outer casing portion and in contact with the opposite surface of the outer casing portion flange, each collar provided with at least a pair of apertures therethrough, the collars positioned so that the respective apertures of the associated collars are aligned, and a threaded fastener passing through each of the pair of associated apertures the threaded fasteners positioned tightly thereby forming an hermetic seal.

2. A cell casing as in claim 1, each of the outer casing portions has opposite open ends and a flange at one open end, a removable closed end for the opposite open end of each of the outer casing portions.

3. A cell casing as in claim 1, in which each closed end has a fill opening therein, and a fill tube affixed to the closed end and in communication with the fill opening.

4. A cell casing as in claim 1, in which an aluminum foil ring is positioned between each surface of the ceramic ring and the associated retainer ring and open edge sealing ring.

5. A hermetically sealed sodium-sulfur cell comprising a ceramic ring, an inner casing of a solid sodium ion-conductive material with one open end, a glass seal sealing a portion of the outer wall of the inner casing adjacent its open end within and to the ceramic ring, a first outer casing portion with an open and a closed end and a flange at the open end, the first outer casing portion surrounding the inner casing and spaced therefrom, the flange of the first outer casing portion adjacent the ceramic ring, a second outer casing portion with an open and a closed end and a flange at the open end positioned with the flange adjacent the ceramic ring whereby the second outer casing portion is spaced from and extends in an opposite direction to the first outer casing portion, the first and second outer casing portions joined to the ceramic ring by a hermetic mechanical seal thereby forming a continuous outer cell casing, the hermetic mechanical seal comprising a pair of retainer rings, the hermetic mechanical seal insulated electrically from the outer casing portions, each retainer ring of the pair of retainer rings positioned between the ceramic ring and an adjacent flange of an associated outer casing portion, a pair of open edge metallic sealing rings, each of the pair of sealing rings positioned exteriorly of and spaced from the associated retainer ring, a retaining collar positioned around each outer metallic portion and in contact with the opposite surface of the outer casing portion flange, each collar provided with at least a pair of apertures therethrough, the collars positioned so that the respective apertures of the associated collars are aligned, a threaded fastener passing through each of the pair of associated apertures, the threaded fasteners positioned tightly thereby forming a hermetic seal, a sodium negative electrode in the inner casing, and a positive electrode in the first outer casing surrounding the inner casing and contacting the outer wall of the inner casing and the inner wall of the first outer casing, the positive electrode comprising sulfur in electrically conductive material.

6. A hermetically sealed sodium-sulfur cell as in claim 5, in which the positive electrode is in the inner casing, and the negative electrode is in the outer casing surrounding the inner casing.

7. A hermetically sealed sodium-sulfur cell as in claim 5, in which each closed end has a fill opening therein, and a sealed fill tube affixed to the closed end and in communication with the fill opening.

* * * * *